United States Patent [19]

Mills

[11] Patent Number: 4,577,094
[45] Date of Patent: Mar. 18, 1986

[54] ELECTRICAL HEATING APPARATUS PROTECTED AGAINST AN OVERHEATING CONDITION

[75] Inventor: Edwin R. Mills, Wake County, N.C.

[73] Assignee: Fieldcrest Mills, Inc., Eden, N.C.

[21] Appl. No.: 539,083

[22] Filed: Oct. 5, 1983

[51] Int. Cl.⁴ .............................................. H05B 1/02
[52] U.S. Cl. .................................... 219/505; 219/508; 219/510; 219/212; 361/106; 361/100
[58] Field of Search ................ 219/504, 405, 508–510, 219/212, 528, 494, 528; 323/225; 361/87, 100, 124, 188, 190, 106

[56] References Cited

U.S. PATENT DOCUMENTS

| | | | |
|---|---|---|---|
| 3,586,831 | 6/1971 | Naoi et al. | 219/505 |
| 4,315,141 | 2/1982 | Mills et al. | 219/505 |
| 4,450,496 | 5/1984 | Doljack et al. | 219/505 |
| 4,485,296 | 11/1984 | Ueda et al. | 219/505 |

Primary Examiner—M. H. Paschall
Attorney, Agent, or Firm—Bell, Seltzer, Park & Gibson

[57] ABSTRACT

An electrical heating apparatus protected against an overheating condition is disclosed. It includes an electrical heater and an elongate heat sensor disposed in a thermally responsive relationship. The heat sensor consists of a single conductor having positive temperature coefficient electrical impedance characteristics continuously along its entire length. The electricity flowing through the electrical heater is controlled in response to a signal from the heat sensitive conductor.

29 Claims, 10 Drawing Figures

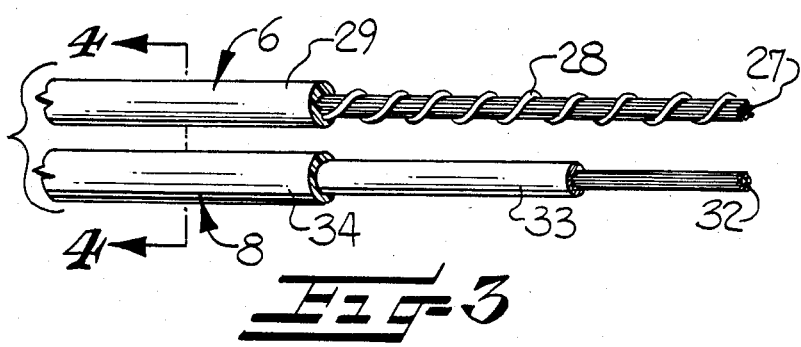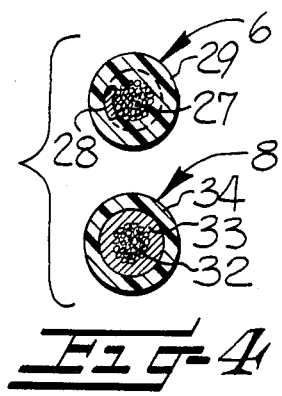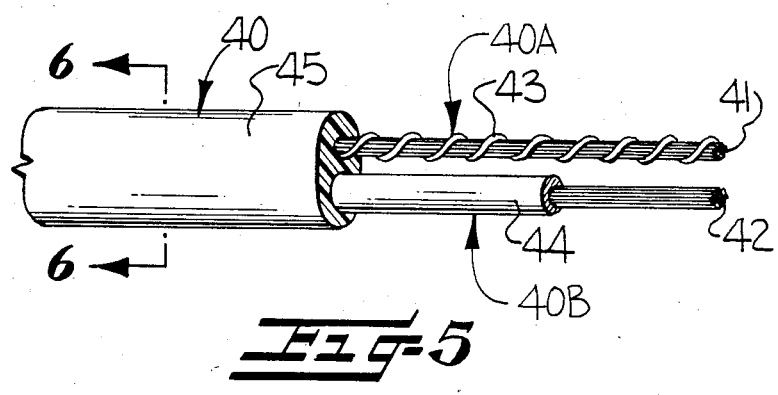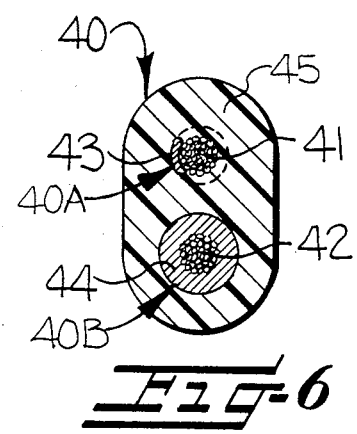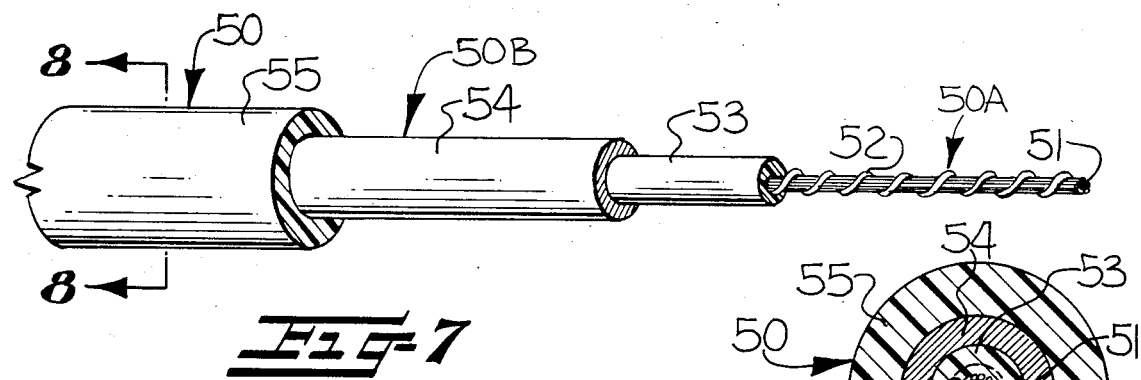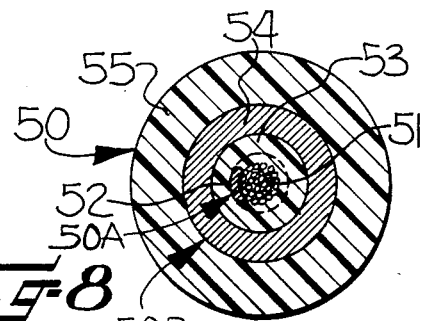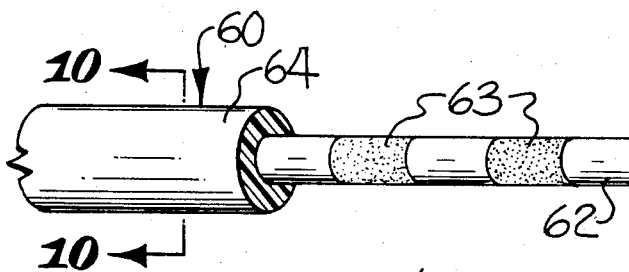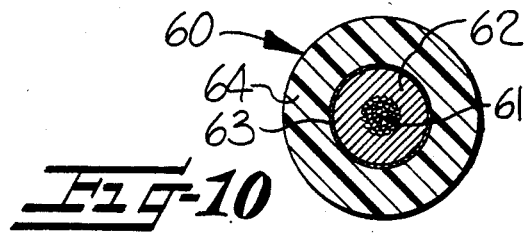

ELECTRICAL HEATING APPARATUS PROTECTED AGAINST AN OVERHEATING CONDITION

FIELD OF THE INVENTION

This invention relates to an electrical heating apparatus with a self monitoring overheat protection circuit. The invention is suitable for use in personal comfort or medical aid items, such as an electrically heated bedcover or blanket.

BACKGROUND OF THE INVENTION

Electrically heated personal comfort or medical aid devices typically include an electrical resistance heater wire threaded between a pair of fabric covers. Heat is generated and supplied to the user when electrical energy is applied across the heater wire. To provide a uniform distribution of heat, the heater wire is usually distributed or located in a plurality of parallel, evenly spaced channels that extend across substantially the entire area of the blanket or other device. Although reference will be made to an electric blanket throughout, it is to be understood that the invention may be used with other personal heating items, such as hot pads, heated socks, etc., and with other items where heating is sought with protection against overheating.

To guard against overheating a control is included for the user to manually open the circuit providing electrical energy to the heater wire. Overheating may result from the placement of a thermally insulating cover over the blanket, a bunching of the blanket, irregularities in the amount of electrical energy applied to the heater wire, or an electrical or mechanical malfunction. Such an overheating may be detrimental to the user and materials adjacent the heater wire, so it is also desirable to have a self monitoring heat sensitive device that will automatically control the flow of electrical energy to the heater wire in the event that the user does not detect an overheating condition or fails to manually open the circuit.

In the past, a variety of overheating protection circuits have been utilized, but all had drawbacks. In one arrangement, a number of conventional bimetallic thermostatic switches were placed in series with the heater wire at various locations throughout the blanket. These switches were normally closed, but when an overheat temperature was sensed in the vicinity of a thermostatic switch, it opened, interrupting the flow of electrical energy and the generation of heat. This approach suffered due to the bulk and expense of the thermostatic switches, and due to the limited area or number of zones that were monitored by each switch, which left certain portions of the blanket unmonitored.

A type of thermostatless overheat protection circuit was disclosed in commonly assigned U.S. Pat. No. 4,198,562 issued Apr. 15, 1980. It employed a pair of solid state switching devices in the heating element circuit. The gates thereof were electrically connected in series by a single conductor electrically connecting a finite number of discrete sensors or thermistors. They were connected in series and rendered the switching devices nonconductive if an overheating condition was sensed.

Another type of thermostatless overheat protection circuit was disclosed in commonly assigned U.S. Pat. No. 3,683,151 issued Aug. 8, 1972. This circuit included a sensor having a temperature sensitive dielectric between a pair of signal wires. A single gate controlled semiconductor switch responded to a change in the dielectric characteristic of the material between the sensor wires to reduce the energy delivered to a heating element in response to an overheating condition. Commonly assigned U.S. Pat. No. 4,315,141 issued Feb. 9, 1982 disclosed a pair of solid state switching devices in a heating element circuit. The gates of each semiconductor switch were electrically connected to dual conductor temperature sensors having a temperature sensitive dielectric between them. The switching devices were rendered nonconductive if an overheating condition was sensed. These circuits utilized relatively expensive sensors, and included additional wires not found in the present invention, which may reduce their operational lifetime.

Other patents, such as U.S. Pat. No. 3,410.984 issued Nov. 12, 1968, disclose electrically heated bedcovers with a self regulating heater formed by a pair of resistance conductors separated by a layer of material having a positive temperature coefficient (PTC) of resistance. As the temperature of the PTC material increases, the impedance increases, thereby reducing current flow between the separated conductors, and reducing heat output. It does not include discrete heating means and an electrical sensor, nor does it include a control means as claimed herein.

Thus, it is an object of the present invention to provide an improved electrical heating apparatus which is protected against overheating and which is less subject to any of the aforementioned deficiencies.

It is a further object of the present invention to provide an improved electrical heating apparatus protected against an overheating condition which monitors all heated portions of a given heating apparatus rather than a limited number of discrete zones, and utilizes a heat sensitive conductor consisting of a single conductor.

It is still a further object of the present invention to provide a comparatively inexpensive electrical heating means and heat sensitive conductor consisting of a single conductor that may be encased in a jacket to form a single strand for placement between a pair of fabric covers.

SUMMARY OF THE INVENTION

The electrical heating apparatus protected against overheating of the present invention is characterized by a simple design having fewer wires or conductors than prior designs; however, it monitors all heated portions of a given apparatus making it more safe and more reliable. Moreover, it reduces the number of conductors in the temperature sensor and eliminates all discrete temperature sensing elements, making the heating apparatus less bulky, less expensive, more reliable, and more aesthetically pleasing.

In particular, the electrical heating apparatus protected against an overheating condition includes an electrical heating means for generating heat in proportion to the amount of electrical current flowing therethrough. A heat sensitive means is disposed in a thermally responsive relationship with respect to the electrical heating means. The heat sensitive means consists of a single conductor having positive temperature coefficient electrical impedance characteristics continuously along its entire length so that it may detect an overheating condition. Control means controls the electrical current flowing through the heating means in response to a signal from the heat sensitive means.

BRIEF DESCRIPTION OF THE DRAWINGS

For a more complete understanding of this invention reference should now be made to the embodiments illustrated in the accompanying drawings.

FIGS. 3 and 5 are sectioned, perspective views of alternate embodiments of an electrical heating means and a heat sensitive conductor of the present invention parallel to one another.

FIG. 7 is a sectioned, perspective view of an alternate embodiment of the electrical heating means and a heat sensitive conductor of the present invention coaxial to one another.

FIG. 9 is a sectioned, perspective view of an alternative embodiment of the heat sensitive conductor of the present invention.

FIGS. 4, 6, 8 and 10 are sectioned views taken, respectively, along the lines 4—4 of FIG. 3, lines 6—6 of FIG. 5, lines 8—8 of FIG. 7, and lines 10—10 of FIG. 9.

DESCRIPTION OF THE INVENTION

Figure 1:
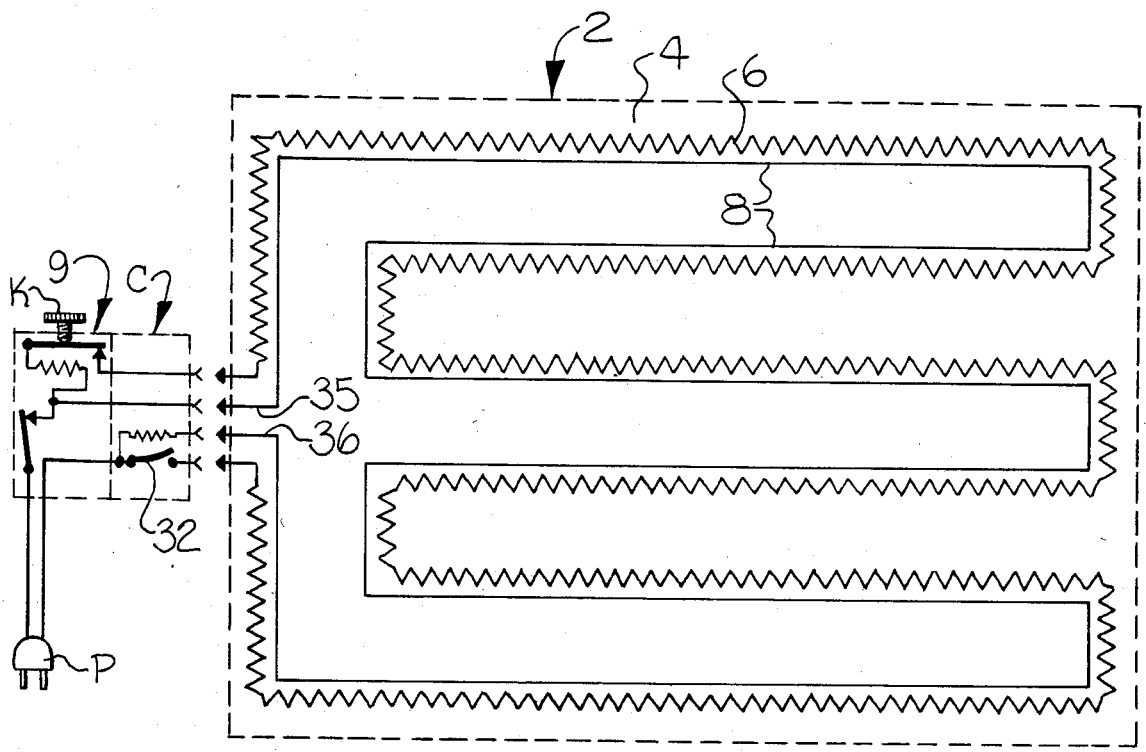
FIG. 1 is a schematic diagram of an electrical heating apparatus with an overheat protection circuit in accordance with the present invention.

Referring to FIG. 1, an electrical heating apparatus 2, such as an electrically heated blanket, includes an envelope 4, an electrical heating means 6, a heat sensitive conductor 8, and a control means 9.

The envelope 4 may be fabric, plastic, or any other material that is suitable for use with an electrical heating apparatus. It may include channels or tunnels (not shown) to contain or position the electrical heating means 6 or heat sensitive conductor 8, or it may be comprised of two layers laminated or stitched together, as necessary or desirable.

The control means 9 includes a plug P for insertion into a standard wall outlet, a temperature control knob K which is adjusted to select a desired temperature level, and a control circuit C which includes suitable thermal mechanical or solid state switching means for controlling the electrical current flowing to the heating means 6 if an overheating condition is sensed. FIG. 1 illustrates a suitable control circuit C which utilizes a normally open thermal switch 32 for controlling the flow of electrical energy to the heating means 6, and in which the heat sensitive conductor 8 has positive temperature coefficient (PTC) electrical impedance characteristics. The control circuit C could similarly utilize semiconductor switching devices, wherein the enabling or gate current for a triac, silicon controlled rectifier, diac, or the like, may be passed through the heat sensitive conductor 8. See FIG. 2 for a suitable solid state controller circuit. Assuming the heat sensitive conductor has a positive temperature coefficient electrical impedance (PTC), an overheating condition would cause an increase in resistance, reducing the current flow therethrough. Properly biased, the semiconductor switch will modulate downward the current flowing through the heating means 6 as the temperature of the heat sensitive conductor increases, and cease to conduct when the temperature of the heat sensitive conductor increases to some higher level.

Figure 2:
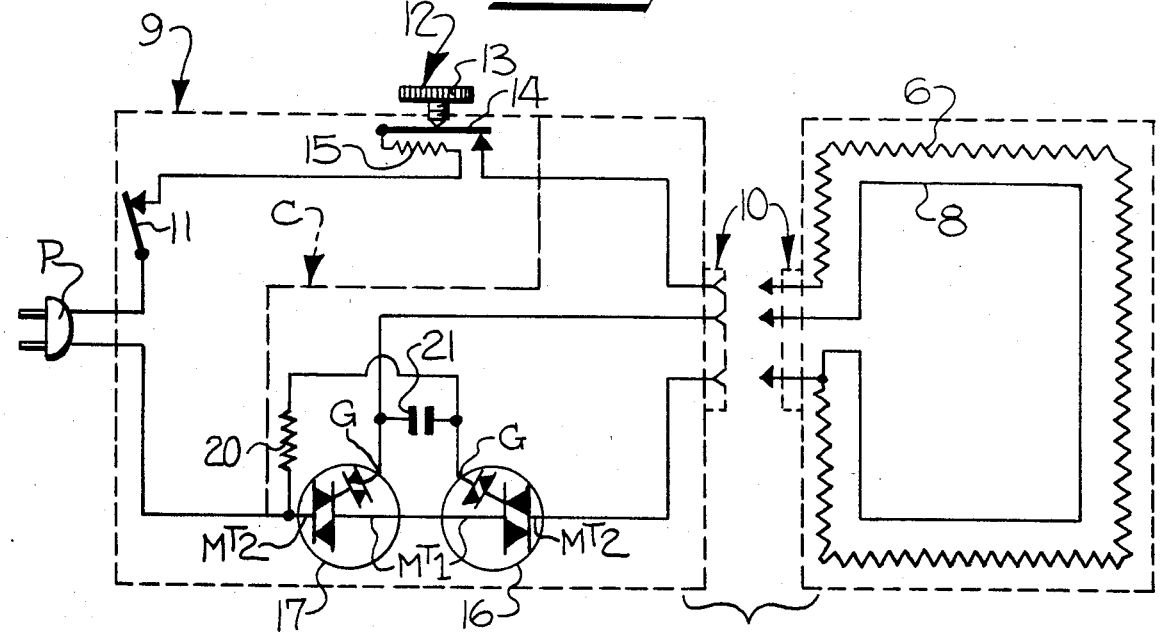
FIG. 2 is a schematic diagram of a controller and an electric blanket including a heat sensitive electrical sensor of the present invention.

Referring more specifically to FIG. 2, the control means 9 includes a solid state control circuit C shown within the dotted lines. An electrical heating apparatus 2 protected against an overheating condition is connected to the control means 9 by a suitable connector 10. The control means 9 includes a standard plug P for insertion into a wall outlet. In series with the plug is an on-off switch 11 for manual operation by the user as a master switch. In series with the on-off switch is a manually operable temperature control 12 having a knob 13, a bimetallic leaf switch contact 14, and a compensating heater 15. An alternate temperature control is disclosed in U.S. Pat. No. 3,588,446.

Further in series, through connector 10, is an electrical heating means 6 and a pair of gate controlled bidirectional semiconductor switches 16, 17. Those used in the present invention have been commonly identified by the generic term "quadrac" and are available from various manufacturers. The quadrac is a bistable semiconductor device triggered through an integral diac and which can block voltage in either direction, conduct current in either direction, and be triggered for conducting current in either direction by the application of gate signals. The basic switch structure typically includes a terminal $MT_1$ and an adjacent gate terminal G located on one side of the device, and a terminal $MT_2$ on the opposite side. The region of the semiconductor between the terminals $MT_1$ and $MT_2$ is in the form of a pair of parallel semiconductor switches. The gate terminal is indicated by a line emanating from the $MT_1$ side of the schematic symbol and including, within the envelope of the device, complementary triangular symbols indicating the diac or diode characteristic of the gate portion of the device. Terminal $MT_1$ is the reference point for measurement of voltages and currents at the gate terminal G and at the opposite terminal $MT_2$. The $MT_1$ terminal side of the switch is often regarded as the "front" of the device and the $MT_2$ terminal side of the quadrac is regarded as the "back" of the device. For ease of understanding, this terminology is used in the present description and claims in order to specify the interconnection of the pair of switches. The pair of gate controlled bidirectional semiconductor switches provided in accordance with the present invention are electrically connected to one another in series and in front-to-front orientation. That is, the $MT_1$ terminal sides of the devices are directly joined, with the $MT_2$ terminal sides serving to connect the switches in series relation with the electrical resistance heating means 6.

The heat sensitive conductor 8 is connected in series between the gate G of one semiconductor switch 17 and the $MT_2$ terminal of the other semiconductor switch 16. The heat sensitive conductor is a PTC material having an electrical impedance that increases with an increase in temperature. If an overheating condition occurs, the impedance increases and reduces the current flow through the sensor wire to the gate G. Depending upon the temperature-impedance characteristics of the heat sensitive conductor and the biasing network for the semiconductor switch, the current flow to the electrical heating means may be modulated or blocked, permitting the heating means to cool to a safer temperature. It is to be noted that the heat sensitive conductor consists of a single conductor, which greatly simplifies the control circuit, permits use of a less expensive connector 10, and minimizes the number of wires in the electrical heating apparatus.

The gate G of semiconductor switch 16 may be connected through a suitable biasing resistor 20 to allow triggering in a normal fashion.

In the event that either of the switches 16, 17 should fail in an open or nonconducting state, the circuit enters a condition in which no current is conducted to the heating means. Should one switch fail in a shorted or conductive state, the other switch will not be triggered into conduction; thus no current is conducted to the heating means. This result follows from the "crossover" connection of the gate circuits. That is, the gate G for one switch is connected to the "back" terminal $MT_2$ of the other switch.

FIGS. 3-10 illustrate alternate embodiments of the electrical heating means and heat sensitive conductor of the present invention. Referring to FIG. 3, the electrical heating means 6 includes a central core 27, such as an electrically nonconductive textile strand or other material to provide mechanical strength to the heating means. The physical and mechanical characteristics of the core 27 may be chosen, as desirable, to limit its flexibility, thereby avoiding kinks or bends that might tend to break or knot the heating means. A known resistance heater wire 28 is wrapped around the central core in a helix, and it provides heat when electrical current flows therethrough. An electrically insulating jacket 29 coaxially surrounds the heater wire and central core. The thermodynamic properties of the insulating jacket 29 may vary as necessary to suit a particular application or to match the thermodynamic properties or location of the temperature sensing means. Likewise, the mechanical and physical properties may vary as desirable to minimize cutting, chafing or the like.

The heat sensitive conductor 8, which does not have to be parallel to the heating means 6, includes a central core 32, such as an electrically nonconductive textile strand or other material, to provide mechanical strength in a manner similar to core 27. A conductor 33 having an electrical impedance proportional to temperature is coaxially disposed by extrusion or otherwise around the core material 32. The change in impedance for each degree of change in temperature may also vary as necessary or desirable to be compatible with the control means 9 or to provide the desired sensitivity for the control means. By way of example, a suitable material for a positive temperature coefficient material may include a thermoplastic material to which carbon has been added, and such a sensor wire may be suitable for extrusion manufacturing. The thermoplastic material exhibits a low impedance at lower temperatures and a higher impedance at higher temperatures. An electrically insulating jacket 34 coaxially surrounds the conductor 33. The thermodynamic properties of the insulating jacket may vary as necessary to suit a particular application. For instance, if the electrical heating means 6 and temperature sensing means 8 are in close proximity or are in the same channel in the blanket, the insulation may have more thermodynamic resistance than if the two are separated by one or more thicknesses of fabric.

As illustrated in FIG. 1 the heat sensitive conductor is preferably substantially coextensive with said heating means to provide a continuous, uninterrupted temperature sensitive overheating protection system, unlike the localized, discrete sensors used in the prior art. And, by placing the temperature sensing means in a fixed spaced relationship with respect to the heating means, the accuracy and uniformity of the temperature sensing and overheating detection is significantly enhanced. Suitable embodiments are illustrated in FIGS. 5-8.

Referring to FIGS. 5 and 6, and using like numerals to designate like items, a parallel, unitary heater-sensor 40 is illustrated, and it includes an electrical heating means 40A and a heat sensitive conductor 40B. A pair of core strands or yarns 41, 42 are disposed in a fixed, spaced parallel relationship. Core strand 41 is wrapped with a helix of electrically conductive heater wire 43, and core strand 42 is coaxially encased by a heat sensitive conductor 44. An electrically insulating outer casing 45 maintains the heater wire-core strand combination 41, 43 in a fixed, spaced parallel relationship with respect to the heat sensitive conductor-core yarn combination 42, 44. As noted earlier, this spacing may result in a predetermined thermal relationship between the two conductors along their entire length, but the spacing is not critical.

Referring to FIGS. 7 and 8, and using like numerals to designate like items, a coaxial unitary heater-sensor wire 50 is illustrated, and it includes an electrical heating means 50A and a heat sensitive conductor 50B. Moving radially outwardly from the center, a central core 51, such as a textile strands or yarn, is wrapped on the outer surface thereof with a helix of conducting heater wire 52, which functions as a conventional heating element. A layer of electrical insulation 53 coaxially encases the conductor 52 and core 51. A heat sensitive conductor 54 coaxially encases the electrical insulation 53, and another layer of electrical insulation 55 coaxially encases the heat sensitive conductor 54. The radial thickness of the insulating layer 53 may provide a fixed, selected spacing between the heater wire 52 and heat sensitive conductor 54, resulting in a predetermined thermal relationship between the two for uniformity of operation throughout the entire length of the heater-sensor wire.

Referring to FIGS. 9 and 10, an alternate embodiment heat sensitive conductor 60 is illustrated. It includes a central core 61 of yarn or other suitable material as described earlier. A heat sensitive conductor 62 having a positive temperature impedance coefficient is coaxially disposed around the core material. If it is desired to raise the conductivity in a local region or over a selected length of the conductor, a conductive material 63 may be applied to the surface of the conductor at predetermined spaced intervals. Suitable materials may include conductive paint, film, braid or wire. An electrically insulating jacket 64 coaxially surrounds the heat sensitive conductor 62, any conductive overlays 63, and the core 61.

As with the alternate embodiments disclosed herein, it is apparent that this invention is capable of various modifications. Accordingly, while the invention disclosed herein has been described with reference to a preferred embodiment, it is to be understood that this disclosure is to be interpreted in its broadest sense and encompass the use of equivalent apparatus and configurations.

That which is claimed is:

1. An electrical heating apparatus protected against an overheating condition and comprising
   an electrical heating means for generating heat in proportion to the amount of electrical current flowing therethrough, said heating means providing essentially all of the heat for the apparatus;
   a heat sensitive means in a thermally responsive relationship with respect to said electrical heating means for monitoring the heat generated by said electrical heating means and for providing a signal in response to an overheating condition, said heat sensitive means consisting of a single conductor having positive temperature coefficient electrical impedance characteristics continuously along its entire length so that it may detect an overheating condition at any position along its entire length; and control means associated with said electrical heating means and said heat sensitive conductor for controlling the electrical current flowing through said electrical heating means in response to a signal from said heat sensitive conductor.

2. The apparatus of claim 1 wherein said control means comprises semiconductor switch means electrically connected in series with said electrical heating means.

3. The apparatus of claim 1 wherein said control means comprises gate controlled semiconductor means having terminals electrically connected in series with said electrical heating means and a gate terminal electrically connected to said heat sensitive conductor.

4. The apparatus of claim 1 wherein said control means comprises a pair of gate controlled bidirectional semiconductor switches connected to one another in series, means connecting said pair of semiconductor switches in series to said electrical heating means for permitting either one to control the electrical current flowing through said electrical heating means, means electrically connecting the gate of one of said semiconductor switches to a terminal of said other semiconductor switch through said positive temperature coefficient heat sensitive single conductor and means electrically connecting the gate of said other semiconductor switch to a terminal of said one of said semiconductor switches for triggering the semiconductor switches in response to the sensing of an overheating condition.

5. The apparatus of claim 1 wherein said electrical heating means and said heat sensitive conductor are substantially coextensive.

6. The apparatus of claim 5 wherein said electrical heating means and said heat sensitive conductor are coaxially disposed with respect to one another.

7. The apparatus of claim 6 further including a core strand for reinforcement, said heating means being disposed closer to said core strand.

8. The apparatus of claim 1 wherein said electrical heating means and said heat sensitive conductor are disposed in side-by-side relation.

9. The apparatus of claim 8 further including a core strand for reinforcement and a jacket encasing said core strand said electrical heating means and said heat sensitive conductor to form a single strand.

10. The apparatus of claim 4 wherein said semiconductor switches are connected in front-to-front ($MT_1$ to $MT_1$) orientation.

11. The apparatus of claim 1 further comprising a jacket encasing both said electrical heating means and said heat sensitive conductor to form a single strand.

12. An electrical heating apparatus protected against an overheating condition and comprising an elongate electrical heating means for generating heat in proportion to the amount of electrical current flowing therethrough, said heating means providing essentially all of the heat for the apparatus;

an elongate heat sensitive means in a thermally responsive relationship with respect to said electrical heating means for monitoring the heat generated by said electrical heating means and for providing a signal in response to an overheating condition, said heat sensitive means consisting of a single conductor having positive temperature coefficient electrical impedance characteristics continuously along its entire length so that it may detect an overheating condition at any position along its entire length, said heat sensitive conductor being coextensive with said electrical heating means; and control means associated with said electrical heating means and said heat sensitive conductor for controlling the electrical current flowing through said electrical heating means in response to a signal from said heat sensitive conductor, said control means comprising gate controlled semiconductor switch means having terminals electrically connected in series with said electrical heating means and a gate terminal electrically connected to said heat sensitive conductor for selectively controlling the flow of electrical current through said electrical heating means when an overheating condition is detected by said heat sensitive conductor.

13. The apparatus of claim 12 wherein said control means comprises a pair of gate controlled bidirectional semiconductor switches connected to one another in series, means connecting said pair of semiconductor switches in series to said electrical heating means for permitting either one to control the electrical current flowing through said electrical heating means, means electrically connecting the gate of one of said semiconductor switches to a terminal of said other semiconductor switch through positive temperature coefficient heat sensitive conductor and means electrically connecting the gate of said other semiconductor switch to a terminal of said one of said semiconductor switches for triggering the semiconductor switches in response to the sensing of an overheating condition.

14. The apparatus of claim 12 wherein said electrical heating means and said heat sensitive conductor are coaxially disposed with respect to one another.

15. The apparatus of claim 12 wherein said electrical heating means and said heat sensitive conductor are disposed in side-by-side relation.

16. The apparatus of claim 12 wherein said semiconductor switches are connected in front-to-front ($MT_1$ to $MT_1$) orientation.

17. The apparatus of claim 12 further comprising a jacket encasing both said electrical heating means and said heat sensitive conductor to form a single strand.

18. The apparatus of claim 12 wherein said heat sensitive conductor further includes spaced bands of conductive material on the outer surface of said heat sensitive conductor to lower the resistivity of said heat sensitive conductor along its length.

19. An electrically heated bedcover protected against an overheating condition and comprising a bedcover;

electrical heating means in said bedcover for generating heat in proportion to the amount of electrical current flowing therethrough, said heating means providing essentially all of the heat for the bedcover;

heat sensitive means in a thermally responsive relationship with respect to said electrical heating means and for providing a signal in response to an overheating condition, said heat sensitive means consisting of a single conductor having positive temperature coefficient electrical impedance characteristics continuously along its entire length so that it may detect an overheating condition at any position along its entire length; and control means associated with said electrical heating means and said heat sensitive conductor for controlling the electrical current flowing through said electrical heating means in response to a signal from said heat sensitive conductor.

20. The apparatus of claim 19 wherein said control means comprises semiconductor switch means electrically connected in series with said electrical heating means.

21. The apparatus of claim 19 wherein said control means comprises gate controlled semiconductor means having terminals electrically connected in series with said electrical heating means and a gate terminal electrically connected to said heat sensitive conductor.

22. The apparatus of claim 19 wherein said control means comprises a pair of gate controlled bidirectional semiconductor switches connected to one another in series, means connecting said pair of semiconductor switches in series to said electrical heating means for permitting either one to control the electrical current flowing through said electrical heating means, means electrically connecting the gate of one of said semiconductor switches to a terminal of said other semiconductor switch through positive temperature coefficient heat sensitive single conductor and means electrically connecting the gate of said other semiconductor switch to a terminal of said one of said semiconductor switches for triggering the semiconductor switches in response to the sensing of an overheating condition.

23. The apparatus of claim 19 wherein said electrical heating means and said heat sensitive conductor are substantially coextensive.

24. The apparatus of claim 23 wherein said electrical heating means and said heat sensitive conductor are coaxially disposed with respect to one another.

25. The apparatus of claim 24 further including a core strand for reinforcement, said heating means being disposed closer to said core strand.

26. The apparatus of claim 19 wherein said electrical heating means and said heat sensitive conductor are disposed in side-by-side relation.

27. The apparatus of claim 26 further including a core strand for reinforcement and a jacket encasing said core strand, said electrical heating means and said heat sensitive conductor to form a single strand.

28. The apparatus of claim 22 wherein said semiconductor switches are connected in front-to-front ($MT_1$ to $MT_1$) orientation.

29. The apparatus of claim 19 further comprising a jacket encasing both said electrical heating means and said heat sensitive conductor to form a single strand.

* * * * *